Sept. 30, 1969    HANS-JOACHIM M. FÖRSTER ET AL    3,469,473
DRIVE FOR AUXILIARY UNITS OF AN INTERNAL COMBUSTION
ENGINE, ESPECIALLY IN MOTOR VEHICLES
Filed Sept. 25, 1967

INVENTOR
HANS-JOACHIM M. FOERSTER
WOLFGANG ZAISER

BY *Craig & Antonelli*

ATTORNEYS

United States Patent Office 3,469,473
Patented Sept. 30, 1969

3,469,473
DRIVE FOR AUXILIARY UNITS OF AN INTERNAL COMBUSTION ENGINE, ESPECIALLY IN MOTOR VEHICLES
Hans-Joachim M. Förster, Stuttgart-Riedenberg, and Wolfgang Zaiser, Althutte Kreis Welzheim, Germany, assignors to Daimler-Benz Aktiengesellschaft, Stuttgart-Riedenberg, Germany
Filed Sept. 25, 1967, Ser. No. 670,259
Claims priority, application Germany, Sept. 27, 1966,
D 51,183
Int. Cl. F16h 3/44, 57/10, 3/74
U.S. Cl. 74—781                18 Claims

ABSTRACT OF THE DISCLOSURE

A drive arrangement for the auxiliary aggregates of an internal combustion engine, especially in motor vehicles, which comprises between the belt pulley and the end of the crankshaft, a planetary gear transmission adapted to operate as a direct drive transmission with rotational speeds of the engine above a certain speed and which provides an overdrive when the speed of the engine drops below the predetermined rotational speed by the engagement of a brake holding fast the reaction member of the planetary gear; the planetary gear transmission is so constructed that it is accommodated on the inside of the pulley and forms a structural unit, closed with respect to the outside, so as to obviate the need for external lubrication. The planet carrier serves as driving member and carries planet gear wheels in meshing engagement with a ring gear connected to the pulley and a sun gear which is either connected by way of a free-wheeling device with the crankshaft or is held fixed upon engagement of the brake when the engine drops below a certain speed.

BACKGROUND OF THE INVENTION

Figure 1:
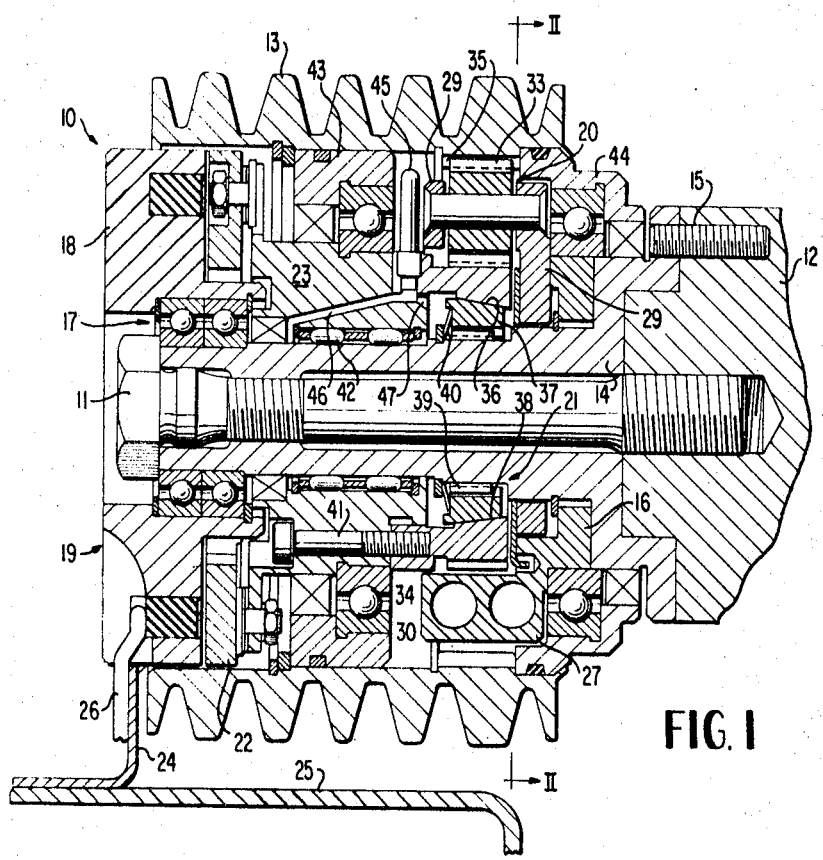

The present invention relates to a drive for the auxiliary aggregates or units of an internal combustion engine, especially in motor vehicles, in which the aggregates or units are driven by V-belts or the like from a belt pulley which is arranged on the end of the crankshaft.

With known aggregate drives of the aforementioned type, the individual aggregates or units, such as, for example, the generator, fan, oil pump for the servo-steering system and still others are driven from a multi-belt pulley on the forward end of the crankshaft either directly or by way of an intermediate drive.

SUMMARY OF THE INVENTION

The present invention is concerned with the purpose to increase the output of these auxiliary aggregates or units at low engine rotational speeds. Furthermore, with the higher rotational speeds of the internal combustion engine an over-speeding of the aggregates or units is to be prevented. Additionally, the present invention aims at constructing this drive both in a compact and space-saving as well as in such a manner that the torsional vibrations of the crankshaft end are not transmitted to the gear wheels.

In solution of the underlying problems, a drive of the aforementioned type is so constructed according to the present invention that a planetary gear transmission is arranged on the inside of the belt pulley, whose planet carrier is in driving connection as the drive or input member with the crankshaft, whose ring gear is connected as output member with the belt pulley and whose sun gear is adapted to be supported as reaction member at the drive or input for a direct speed by way of a free-wheeling device or is adapted to be braked to a fixed support part for an over-drive transmission ratio by a disengageable clutch.

The auxiliary units can be driven with an over-speed gear ratio at low engine rotational speeds by means of the drive arrangement of the present invention. Their output is then again correspondingly increased. The drive according to the present invention is shifted to the direct speed upon exceeding a predetermined engine rotational speed so that an over-speeding of the units is prevented in every case. The drive according to the present invention additionally requires extraordinarily little space, i.e., the space is no larger or hardly larger than the belt pulley already utilized heretofore. Additionally, the drive of the present invention can be constructed as a self-contained structural unit and can be assembled and mounted very readily.

In principle, any known disengageable clutch would be feasible for the drive of the present invention. However, a solution is preferred by the present invention according to which an electro-magnetic brake is provided as brake for shifting or engaging the over-drive speed whose electro-magnet is secured at a support part and whose armature is connected with the sun gear. The energization control of this electro-magnetic brake can take place either manually or automatically. However, it will be appropriate to undertake the disengagement or de-energization automatically in every case by means of a rotational speed supervising device in order that an over-speeding of the units an their damage can be prevented with certainty.

With a preferred construction according to the present invention, the relatively fixed electro-magnet is supported on a part connected with the crankshaft and is secured exclusively in the circumferential direction by the support part. A strap or bracket, for instance, in the form of a curved sheet metal member may thereby serve as support part which, in its turn, is secured at the housing of the internal combustion engine. The strap or bracket is appropriately constructed elastically or springy. In this manner an over-determination of the bearing support of the electro-magnet is avoided. This strap or bracket may also serve simultaneously for the purpose of conducting out the electric lines from the electro-magnet.

In the preferred construction according to the present invention, a member elastic or yielding in the circumferential direction is inserted into the drive connection between the crankshaft and the planet carrier. It is avoided in this manner that in case of rotational vibrations of the crankshaft rattle noises occur in the planetary gear transmission. Furthermore, the present invention prefers a solution according to which the belt pulley is combined with the planetary gear transmission, the clutch and the free-wheeling device into a self-contained and sealed structural unit and this structural unit is mounted at the crankshaft by means of a central securing means. The assembly is extraordinarily simplified in this manner.

The central securing means itself may be constructed in any known manner. However, the present invention proposes that a sleeve is secured at the crankshaft end by means of a central threaded bolt which carries at the crankshaft end a driving flange non-rotationally secured thereto in any conventional manner and which carries at the other end the electro-magnet of the brake rotatably by means of bearings. Roller bearings are thereby provided as bearings although, of course, also other types of bearings may be used. The non-rotational connection takes place according to the present invention by means of teeth which, however, does not preclude the application of any other type of non-rotating connection such as a splined connection or the like. According to the present invention, the sun gear together with the free-wheeling device and the connecting piece to the armature as well as possibly also the planet carrier are supported on the sleeve between the driving flange and the electro-magnet. However, it is also within the purview of the present invention to arrange the planet carrier in a freely floating manner.

Additionally, the present invention proposes that the driving flange engages with axially directed claws between corresponding claw-like parts of the planet gear carrier in such a manner that opposite each claw of the driving flange is located on each side thereof—in the circumferential direction—a claw part of the carrier. The carrier claw parts thereby serve as abutments for springs effective in the forward direction of rotation and for rubber cushions effective in the backward direction of rotation which are arranged tangentially in bores of the driving claws. Several coil springs may then be arranged adjacent one another and the mutually coordinated coil springs and rubber cushions can then be arranged in coaxial dead-end bores of the driving claws.

Any known free-wheeling device or one-way clutch may be used as free-wheeling device or one-way clutch for the sun gear. However, the present invention prefers the application of a spiral free-wheeling device because the latter is inherently insensitive against rotary vibrations. With such a free-wheeling device the outer cone part is then formed according to the present invention by the sun gear, and the inner cone part provided with a spiral thread is secured on the driving sleeve.

Appropriately, the sun gear is threadably connected with the connecting piece which is supported on the sleeve and is operatively connected in a non-rotating manner with the armature plate of the brake whereby, however, the armature plate is axially displaceable with respect to the connecting piece against the effect of conventional return springs. One bearing each is arranged on the connecting piece, on the one hand, and the driving flange, on the other, on which is arranged the belt pulley by means of support flanges. The belt pulley is sealed with respect to the support flanges and itself forms according to the present invention along the inner circumference the teeth for the ring gear of the planetary gear transmission.

The self-contained drive block, closed in itself which is realized in this manner, is filled with oil and therefore requires no external oil supply. However, in order that also the inner bearing places are lubricated sufficiently, the present invention proposes that the sun gear carries at its hub a scoop tube which is disposed with its discharge aperture near the inner circumference of the belt pulley and which is in communication by way of bores or the like with the central bearings. In this manner, the oil—which is centrifuged outwardly by the centrifugal forces—is scooped off by the scoop tube in the over-drive, i.e., with fixed sun gear and is supplied to the inner bearings.

Accordingly, it is an object of the present invention to provide a drive for auxiliary aggregates of an internal combustion engine, especially in motor vehicles, which avoids by extremely simple means the aforementioned shortcomings and drawbacks encountered with the prior art constructions.

It is another object of the present invention to provide a drive unit for auxiliary aggregates of an internal combustion engine which increases the output of these auxiliary aggregates during low rotational speeds of the engine.

A further object of the present invention resides in a drive arrangement for the auxiliary units in an internal combustion engine which prevents with certainty any over-speeding of the units.

Still a further object of the present invention resides in a drive system for auxiliary units and aggregates of internal combustion engines which is both compact and space-saving.

Still another object of the present invention resides in a drive system for the auxiliary units of an internal combustion engine which effectively isolates the gears against torsional vibrations occurring at the end of the crankshaft.

A further object of the present invention resides in a drive of the type described above which can be preassembled as a self-contained unit and can be mounted very easily.

Another object of the present invention resides in a drive unit for the auxiliary aggregates of internal combustion engines which is not only simple and compact but also obviates the need of external oil supply to assure adequate lubrication.

Figure 2:
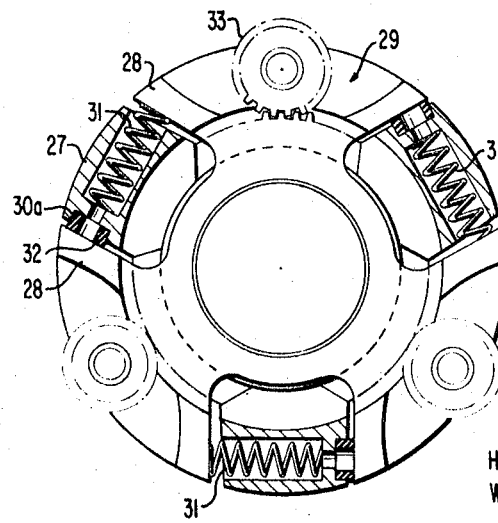

These and further objects, features and advantages of the present invention will become more obvious from the following description when taken in connection with the accompanying drawing, which shows, for purposes of illustration only, one embodiment in accordance with the present invention, and wherein:

FIGURE 1 is an axial longitudinal cross-sectional view through the drive in accordance with the present invention; and FIGURE 2 is a partial cross-sectional view taken along the line II—II of FIGURE 1.

Referring now to the drawing wherein like reference numerals are used throughout the two views to designate like parts, the drive unit in accordance with the present invention illustrated in FIGURE 1—which is constructed of block-shape—is secured at the forward end of the crankshaft 12 (not shown in detail) by means of a central threaded bolt 11. The entire drive block generally designated by reference numeral 10 is accommodated practically within the multi-belt pulley 13 from which the different aggregates or units are driven in a known manner. A sleeve 14 serves for the accommodation of the entire drive block 10 through which extends centrally the threaded bolt 11; the sleeve 14 is constructed flange-like at the end facing the crankshaft 12 while fitting or dowel pins 15 take over the fixing of the sleeve 14 with respect to the crankshaft 12.

The sleeve 14 carries at its end facing the crankshaft 12 a drive flange 16 and at the opposite end on bearings generally designated by reference numeral 17, the electro-magnet 18 of an electro-magnetic brake generally designated by reference numeral 19. Between these two parts 16 and 18 are arranged a planetary gear set generally designated by reference numeral 20, a free-wheeling device or one-way clutch generally designated by reference numeral 21, the armature plate 22 of the electro-magnetic brake 19 and a connecting piece 23 disposed between the armature plate 22 and the sun gear 34. All of these parts are surrounded by the belt pulley 13 so that a structural unit results which is closed with respect to the outside. The electro-magnet 18 is held fixed against rotation by means of a strap or bracket 24, for example, a curved sheet metal member which is secured on a support piece 25 rigidly connected with the housing of the internal combustion engine. The connecting lines 26 of the electro-magnet 18 are also guided out by way of the strap or bracket 24.

The drive flange 16 engages with three axially directed claws 27 (FIG. 2) between claw parts 28 of the planet carrier generally designated by reference numeral 29. Coil springs 31 are arranged in bores 30 disposed adjacent one another so that the torque from the drive flange 16 is transmitted to the planet carrier 29 by way of the claws 27 and the springs 31. Rubber cushions 32 serve as abutments in the opposite direction which are arranged in corresponding bores 30a of the claws 27. The planet gear wheels 33 are supported in a conventional manner on the planet carrier 29. The carrier 29 itself is arranged in a freely floating manner; however, it may also be journalled and supported on the sleeve 14 in a conventional manner.

The planet gear wheels 33 engage in a conventional manner inwardly with a sun gear 34 and outwardly with a ring gear 35. The sun gear 34 forms with its hub inwardly thereof the conical surface 36 of the free-wheeling device 21 which is constructed as spiral free-wheeling device or one-way clutch. Its inner conical part 37 with the outwardly facing conical counter surface 38 is supported on the sleeve 14 by means of a spiral thread 39. Springs 40 keep the two conical parts in mutual abutment. The sun gear 34 is further rigidly connected by means of threaded bolts 41 with the connecting piece 23, which, in its turn, is supported on the sleeve 14 by way of bearings 42. The armature plate 22 of the electromagnetic brake 19 engages in the connecting piece 23 so as to rotate in unison therewith but permitting axial displacement relative thereto.

The ring gear 35 is formed by the belt pulley 13 itself. The belt pulley 13 rests on two support flanges 43 and 44 which, in their turn, are rotatably arranged by means of bearings, on the one hand, on the connecting piece 23, and, on the other, on the driving flange 16. Seals are arranged between the belt pulley 13 and the two support flanges 43 and 44.

One or several scoop tubes 45 are rigidly inserted into the hub of the sun gear 34. These scoop tubes are disposed with their discharge apertures near the inner circumference of the belt pulley 13. They are in communication inwardly thereof with bores 46 and apertures 47 which lead to the inwardly disposed bearings.

OPERATION

During normal rotational speed of the internal combustion engine, the electro-magnetic brake 19 is disengaged or de-energized and the planetary gear transmission 20 is supported by means of its sun gear 34 serving as reaction member on the sleeve 14 by way of the free-wheeling device 21 and therewith on the crankshaft 12. The free-wheeling device 21 prevents an over-taking of the crankshaft by the sun gear 34. Consequently, the entire drive block rotates as unit in the direct speed.

If the rotational speed of the internal combustion engine drops below a predetermined value, then the electromagnetic clutch 19 receives a switching impulse as, for example, from a centrifugal switch, and the electromagnet 18 attracts the armature plate 22. The latter is thereby held fixed and prevents by way of the connecting piece 23 a further rotation of the sun gear 34. This now serves as reaction member and the planetary gear set 20 provides an overdrive changing the slow rotation of the crankshaft 12 into a faster rotation of the belt pulley 13. The belt pulley 13 therefore drives now the auxiliary aggregates with a rotational speed increased with respect to the crankshaft 12.

In its overdrive, the oil disposed within the drive block 10 is thrown outwardly by the centrifugal forces. It collects along the inner circumference of the belt pulley 13. From there, it is conducted by way of the aperture of the fixed scoop tube 45 again inwardly and is supplied through the channels 46 and 47 to the inner bearings or other lubricating places. It is assured in this manner with certainty that also the inwardly disposed bearings are supplied adequately with lubricating oil.

While we have shown and described one embodiment in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. A drive arrangement for auxiliary aggregates of an internal combustion engine, especially in motor vehicles, in which the aggregates are driven from a belt pulley, arranged on the end of the crankshaft, wherein the improvement comprises planetary gear means arranged on the inside of the belt pulley, said planetary gear means including a planet carrier serving as input member and operatively connected with the crankshaft, a ring gear serving as output member and operatively connected with the belt pulley, and a sun gear serving as reaction member, free-wheeling means operable to support the sun gear at the input to provide a direct drive, and disengageable means for selectively connecting said sun gear with a realtively fixed part to provide an overdrive in the planetary gear means, said disengageable means including an electromagnetic brake having an electro-magnet and armature means, a relatively fixed support part supporting said electro-magnet, said armature means being operatively connected with the sun gear, said relatively fixed electro-magnet being supported on a part operatively connected with the crankshaft and being secured by the support part exclusively in the circumferential direction, springy means yielding in the circumferential direction which is inserted in the driving connection between the crankshaft and the planet carrer, wherein the belt pulley together with the planetary getr means, disengageable means and free-wheeling means is combined in a self-contained structural unit, closed with respect to the outside, said structural unit being mounted on the crankshaft by a central securing means, further comprising sleeve means, central bolt means forming part of the central securing means and securing said sleeve means to the chankshaft end, said sleeve means carrying at the crankshaft end a drive flange operatively connected for rotation in unison therewith and at the opposite end the electro-magnet of the disengageable means by way of bearing means.

2. A drive arrangement according to claim 1, wherein the sun gear, the free-wheeling means and a connecting piece connecting the sun gear with the armature means are supported on said sleeve means between the drive flange and the electro-magnet.

3. A drive arrangement according to claim 2, wherein the planet carrier is also supported on the sleeve means between the drive flange and the magnet.

4. A drive arrangement according to claim 3, wherein the drive flange is provided with axially directed claw means engaging between corresponding claw-like parts of the planet carrier in such a manner that each claw means is disposed on each side thereof—as viewed in the circumferential direction—opposite a respective claw part of the planet carrier.

5. A drive arrangement according to claim 4 wherein the claw parts of the planet carrier serve as abutments for spring means effective in the forward direction of rotation and for elastic cushion means effective in the backward direction of rotation which are arranged tangentially in bores provided in the claw means.

6. A driving arrangement according to claim 5, wherein said free-wheeling means is constructed as a spiral free-wheeling device having an outer conical part constituted by the sun gear and an inner conical part secured on the sleeve means by a spirally shaped thread.

7. A drive arrangement according to claim 6, wherein the sun gear is threadably connected with the connecting piece which is supported on the sleeve means and is operatively connected for rotation in unison with the armature plate means of the disengageable means, said armature plate means being displaceable axially against the effect of return spring means with respect to the connecting piece.

8. A drive arrangement according to claim 7, further comprising bearing means coordinated, respectively, to the connecting piece, on the one hand, and the drive flange, on the other, the belt pulley resting on said bearing means by way of support flange means.

9. A drive arrangement according to claim 8, wherein said belt pulley forms itself the teeth for the ring gear at its inner circumference.

10. A drive arrangement according to claim 9, further comprising scoop tube means carried by the sun gear near its hub, said scoop tube means being disposed with the scoop aperture thereof near the inner circumference of the belt pulley, and bore means providing a communication between the scoop tube means the places within the drive arrangement to be lubricated.

11. A drive arrangement for auxiliary aggregates of an internal combustion engine, especially in motor vehicles, in which the aggregates are driven from a belt pulley, arranged on the end of the crankshaft, wherein the improvement comprises planetary gear means arranged on the inside of the belt pulley, said planetary gear means including a planet carrier serving as input member and operatively connected with the crankshaft, a ring gear serving as output member and operatively connected with the belt pulley, and a sun gear serving as reaction member, free-wheeling means operable to support the sun gear at the input to provide a direct drive, and disengageable means for selectively connecting said sun gear with a relatively fixed part to provide an overdrive in the planetary gear means, wherein said disengageable means includes an electromagnetic brake having an electro-magnet and armature means, a relatively fixed support part supporting said electro-magnet, said armature means being operatively connected with the sun gear, further comprising sleeve means, central bolt means securing said sleeve means to the crankshaft end, said sleeve means carrying at the crankshaft end a drive flange operatively connected for rotation in unison therewith and at the opposite end the electro-magnet of the disengageable means by way of bearing means.

12. A drive arrangement according to claim 11, wherein the sun gear, the free-wheeling means and a connecting piece connecting the sun gear with the armature means are supported on said sleeve means between the drive flange and the electro-magnet.

13. A drive arrangement according to claim 12, wherein the planet carrier is also supported on the sleeve means between the drive flange and the magnet.

14. A drive arrangement according to claim 12, wherein the drive flange is provided with axially directed claw means engaging between corresponding claw-like parts of the planet carrier in such a manner that each claw means is disposed on each side thereof—as viewed in the circumferential direction—opposite a respective claw part of the planet carrier.

15. A drive arrangement according to claim 14, wherein the claw parts of the planet carrier serve as abutments for spring means effective in the forward direction of rotation and for elastic cushion means effective in the backward direction of rotation which are arranged tangentially in bores provided in the claw means.

16. A drive arrangement according to claim 11, wherein the drive flange is provided with axially directed claw means engaging between corresponding claw-like parts of the planet carrier in such a manner that each claw means is disposed on each side thereof, as viewed in the circumferential direction—opposite a respective claw part of the planet carrier.

17. A drive arrangement according to claim 16, wherein the claw parts of the planet carrier serve as abutments for spring means effective in the forward direction of rotation and for elastic cushion means effective in the backward direction of rotation which are arranged tangentially in bores provided in the claw means.

18. A drive arrangement for auxiliary aggregates of an internal combustion engine, especially in motor vehicles, in which the aggregates are driven from a belt pulley, arranged on the end of the crankshaft, wherein the improvement comprises planetary gear means arranged on the inside of the belt pulley, said planetary gear means including a planet carrier serving as input member and operatively connected with the crankshaft, a ring gear serving as output member and operatively connected with the belt pulley, and a sun gear serving as reaction member, free-wheeling means operable to support the sun gear at the input to provide a direct drive, and diseagageable means for selectively connecting said sun gear with a relatively fixed part to provide an overdrive in the planetary gear means, further comprising scoop tube means carried by the sun gear near its hub, said scoop tube means being disposed with the scoop aperture thereof near the inner circumference of the belt pulley, and bore means providing a communication between the scoop tube means and the places within the drive arrangement to be lubricated.

References Cited
UNITED STATES PATENTS

| | | | |
|---|---|---|---|
| 2,127,637 | 8/1938 | Barnes | 74—781 X |
| 2,183,485 | 12/1939 | Butzback et al. | 74—781 X |
| 2,437,467 | 3/1948 | Herring et al. | 74—781 |
| 2,620,899 | 12/1952 | Swift | 74—781 X |
| 2,630,025 | 3/1953 | Lapsley | 74—781 |
| 3,108,494 | 10/1963 | Kell | 74—781 X |
| 3,189,150 | 6/1965 | Chapman | 192—84 |
| 3,190,414 | 6/1965 | Maurer et al. | 192—84 X |

ARTHUR T. McKEON, Primary Examiner

U.S. Cl. X.R.

74—752